United States Patent
Larkin et al.

(10) Patent No.: US 6,543,520 B2
(45) Date of Patent: Apr. 8, 2003

(54) LOW-DISTORTION AXIAL SEAL PLATE FOR AIR PREHEATERS

(75) Inventors: James R. Larkin, Wellsville, NY (US); Kevin J. O'Boyle, Wellsville, NY (US); Michael Zakel, Wellsville, NY (US)

(73) Assignee: Alstom Power N.V., Amsterdam (NL)

( * ) Notice: Subject to any disclaimer, the term of this patent is extended or adjusted under 35 U.S.C. 154(b) by 18 days.

(21) Appl. No.: 09/790,101

(22) Filed: Feb. 21, 2001

(65) Prior Publication Data

US 2002/0112842 A1 Aug. 22, 2002

(51) Int. Cl.$^7$ .............................................. F23L 15/02
(52) U.S. Cl. ................... 165/9; 165/10; 165/8
(58) Field of Search .................. 165/8, 9, 10

(56) References Cited

U.S. PATENT DOCUMENTS

| | | | | |
|---|---|---|---|---|
| 2,684,230 A | * | 7/1954 | Hammond | 165/9 |
| 2,873,952 A | | 2/1959 | Mudersbach et al. | |
| 3,265,119 A | * | 8/1966 | Mittmann | 165/9 |
| 3,267,561 A | * | 8/1966 | Richer et al. | 165/9 |
| 3,800,860 A | * | 4/1974 | Johnsson | 165/9 |
| 4,073,337 A | * | 2/1978 | Stockman | 165/9 |
| 5,628,360 A | * | 5/1997 | Brophy et al. | 165/9 |
| 5,727,617 A | * | 3/1998 | O'Boyle | 165/9 |
| 5,803,157 A | * | 9/1998 | Brophy et al. | 165/8 |

FOREIGN PATENT DOCUMENTS

| | | |
|---|---|---|
| DE | 1 045 032 | 11/1958 |
| FR | 2 369 530 | 5/1978 |

OTHER PUBLICATIONS

International Search Report, dtd. Sep. 30, 2002, corresponding to International Application No. PCT/US 02/02447.

* cited by examiner

Primary Examiner—Christopher Atkinson
(74) Attorney, Agent, or Firm—Alix, Yale & Ristas, LLP

(57) ABSTRACT

An axial seal plate for an air preheater having a single, unitary structure including a sealing portion disposed intermediate first and second end portions extending orthogonally from the sealing portion. The axial seal plate does not including any welds for joining the end portions to the sealing portion.

9 Claims, 6 Drawing Sheets

LOW-DISTORTION AXIAL SEAL PLATE FOR AIR PREHEATERS

BACKGROUND OF THE INVENTION

The present invention relates to the apparatus of a rotary regenerative air preheater. More particularly, the invention relates to axial seal plates of air preheaters.

A rotary regenerative air preheater transfers sensible heat from the flue gas leaving a boiler to the entering combustion air through regenerative heat transfer surface in a rotor which turns continuously through the gas and air streams. The rotor, which is packed with the heat transfer surface, is divided into compartments by a number of radially extending plates referred to as diaphragms. These compartments are adapted to hold modular baskets in which the heat transfer surface is contained.

The air preheater is divided into a flue gas side or sector and one or more combustion air sides or sectors by sector plates. In a typical installed rotary regenerative heat exchanger, flexible radial seals mounted on the top and bottom edges of the diaphragms are in close proximity to these sector plates and minimize leakage of gas and air between sectors. Similarly, flexible axial seals mounted on the outboard edge of the diaphragms are in close proximity to axial seal plate assemblies mounted on the inner surface of the housing and minimize leakage therebetween.

Conventional axial seal plate assemblies include numerous component parts. The axial seal plate generally includes a pair of side plates which are each mounted to the side edges of a curved sealing plate by long seam weld. Multiple support ribs are mounted to the radially outer surface of the axial seal plate to provide pressure stiffening. The support ribs are usually burned to a radius and are welded to the sealing plate. The long length of the weld joining the side plates to the sealing plate leads to various weld distortions, which effect the close tolerances required for the axial seal plate.

The axial seal plate seal surface it set at its proper position through the use of access doors on each side of the seal plate, which allow access for measuring the critical sealing gaps on each side of the axial seal plate assembly.

SUMMARY OF THE INVENTION

Briefly stated, the invention in a preferred form is an axial seal plate for an air preheater having a single, unitary structure including a sealing portion disposed intermediate first and second end portions extending orthogonally from the sealing portion. The axial seal plate does not including any welds for joining the end portions to the sealing portion.

Preferably, the axial seal plate also has first and second transition portions disposed between the sealing portion and the first and second end portions, respectively. Each transition portion extends at an angle of 45° from the sealing portion and the respective end portion extends at an angle of 45° from the transition portion.

The axial seal plate also includes multiple pressure stiffening bars mounted to the sealing portion. Preferably, at least one tab mounts each of the pressure stiffening bars to the sealing portion. The inner edge of each tab is welded to the outer surface of the sealing portion and the outer edge portion of each tab is welded to the pressure stiffening bar to mount the pressure stiffening bars to the seal plate.

It is an object of the invention to provide an axial seal plate which requires less structural parts and eliminates the need for access doors.

It is also an object of the invention to provide an axial seal plate which requires less welding during construction.

It is further an object of the invention to provide an axial seal plate which requires no machining of the seal surface.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DESCRIPTION OF THE PREFERRED EMBODIMENT

Figure 1:
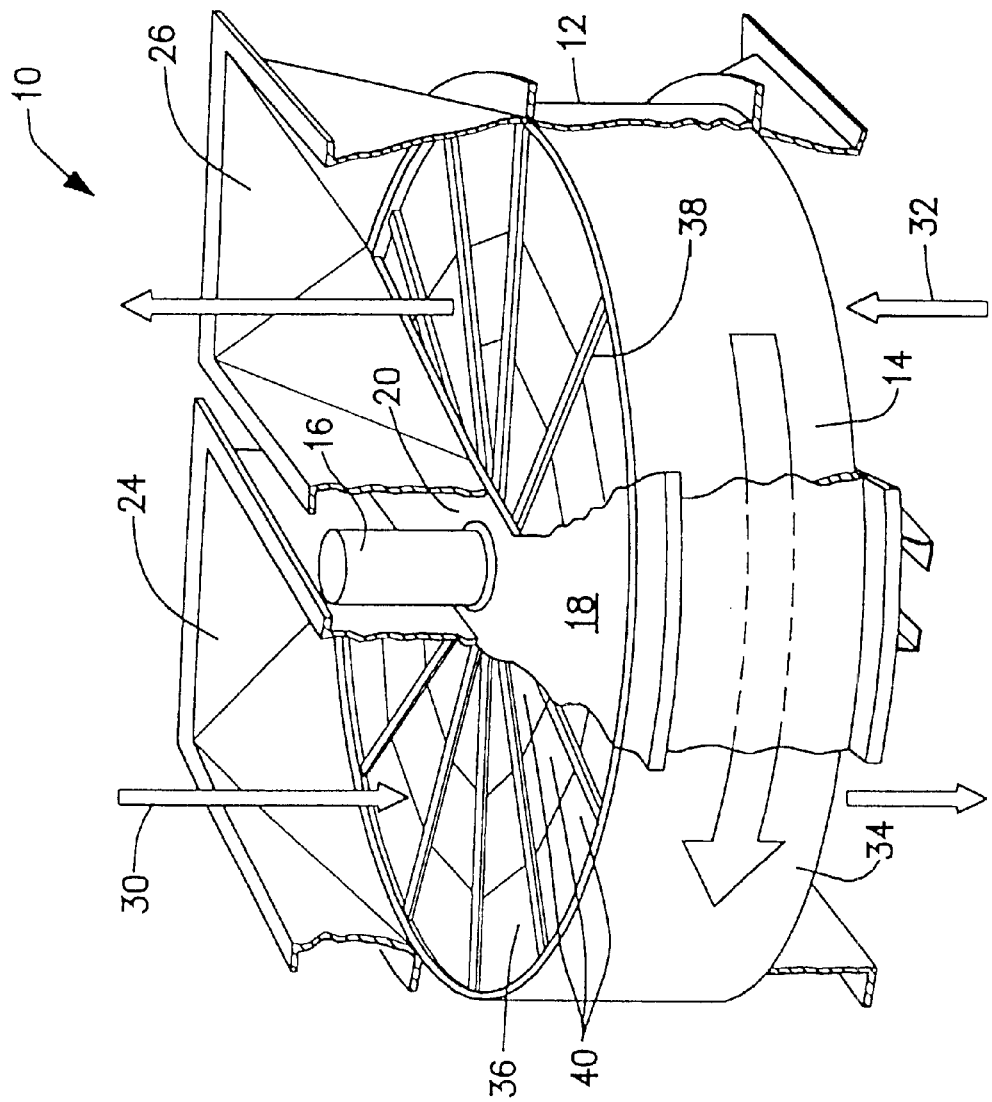
FIG. 1 is a general perspective view of a conventional bisector rotary regenerative air preheater which is cut-away to show the upper sector plates.
Figure 2:
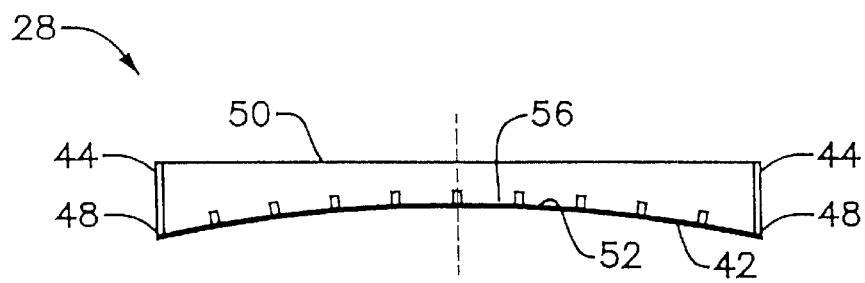
FIG. 2 is a top view of a conventional axial seal plate assembly.
Figure 3:
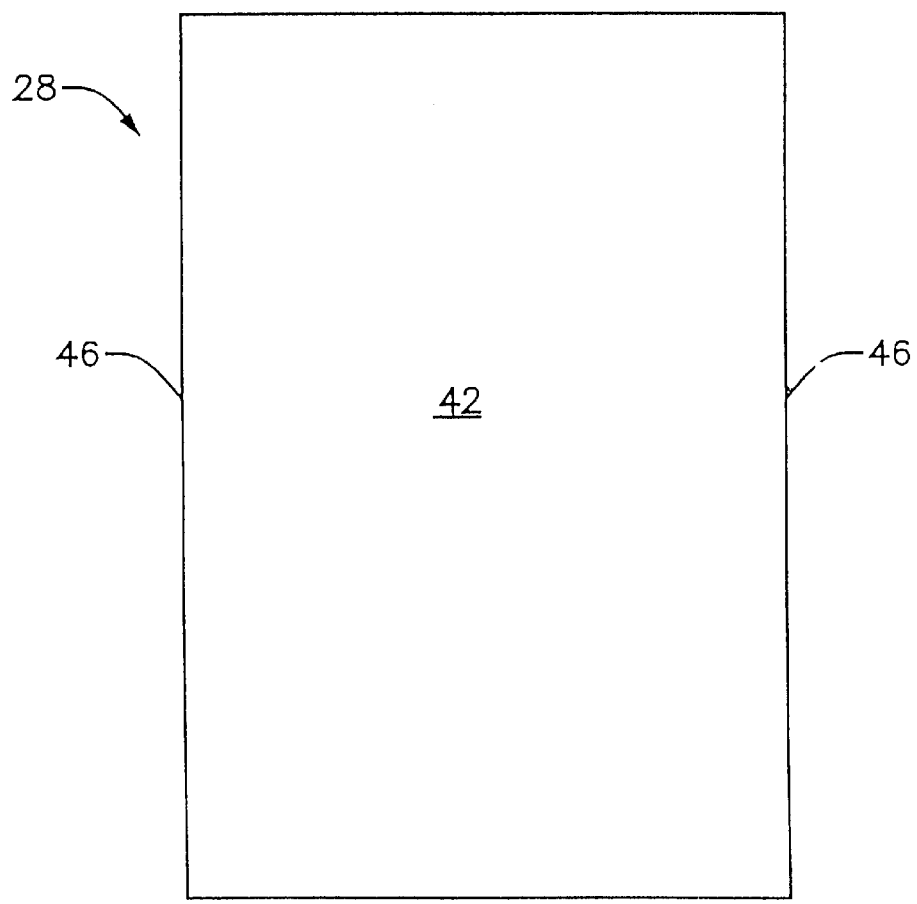
FIG. 3 is a front view of the axial seal plate assembly of FIG. 2.
Figure 4:
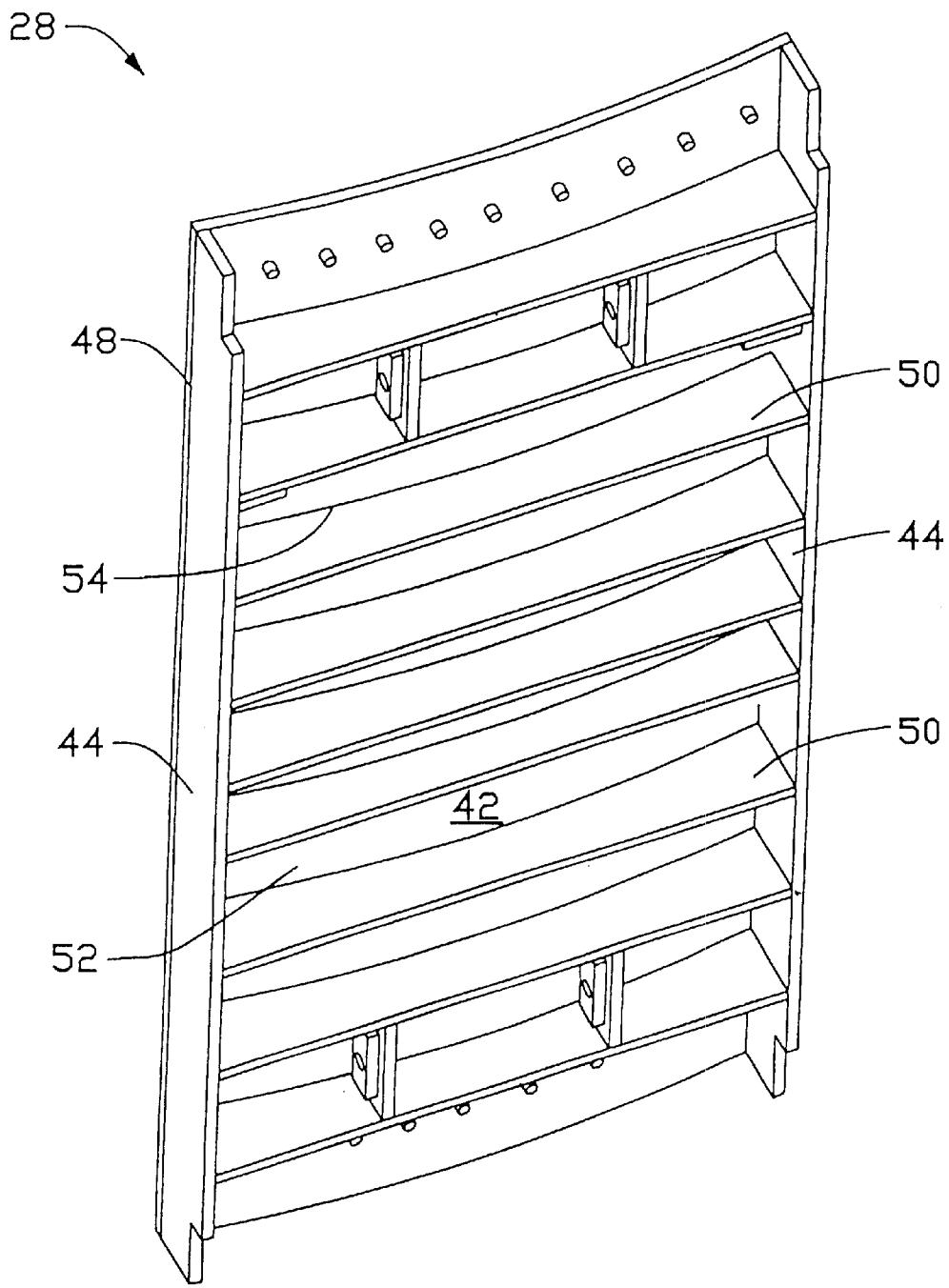
FIG. 4 is a perspective view of the radially outer side of the axial seal plate assembly of FIG. 2.
Figure 5:
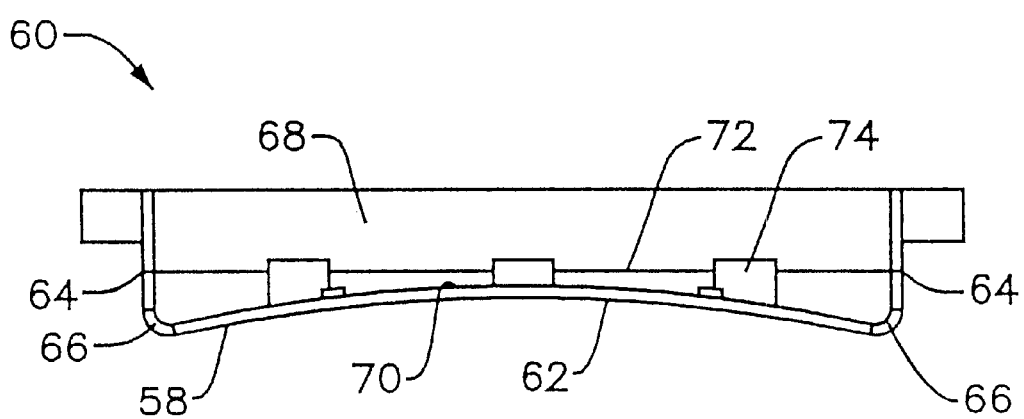
FIG. 5 is a top view of an axial seal plate assembly in accordance with the invention.
Figure 6:
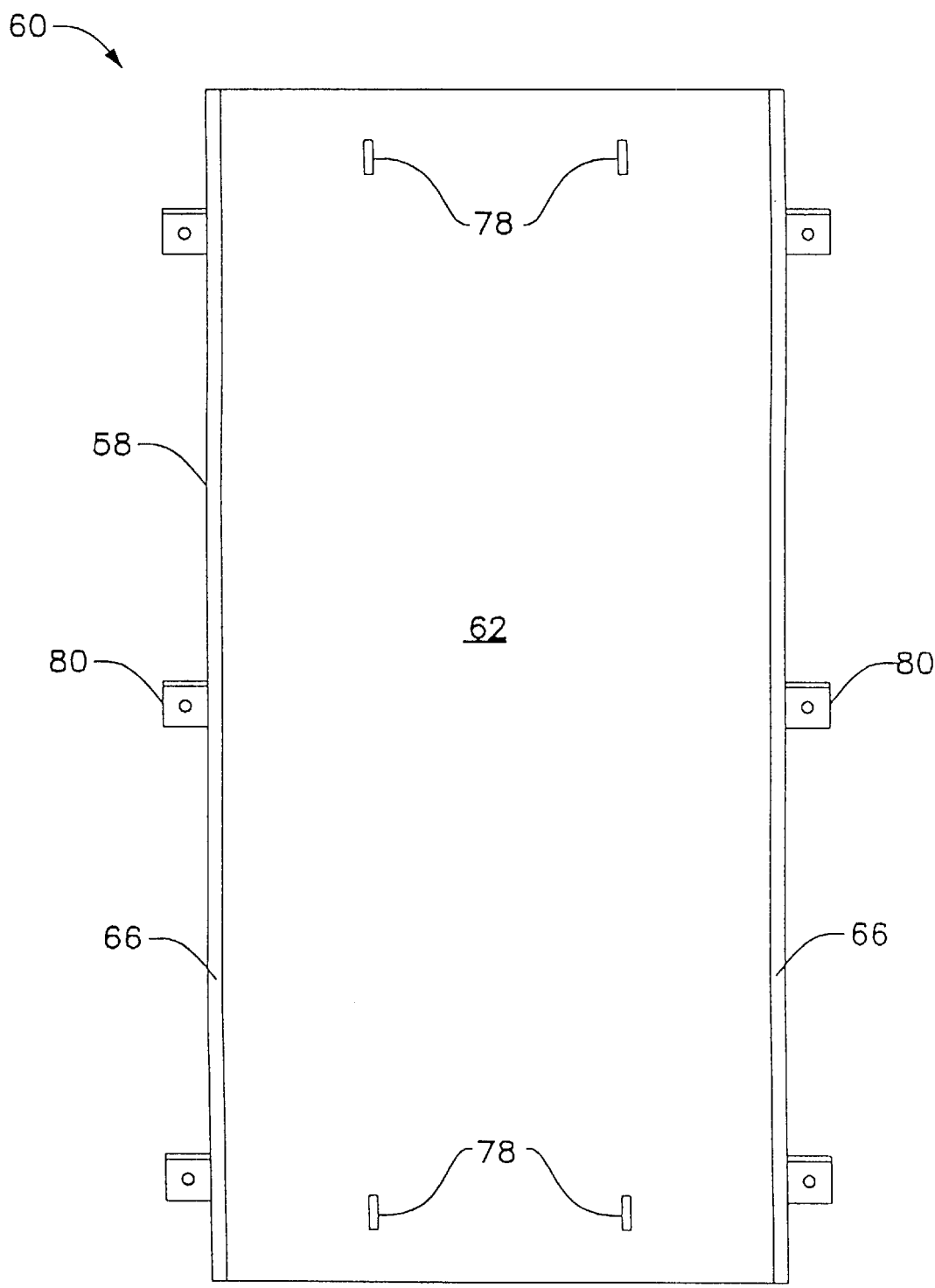
FIG. 6 is a front view of the axial seal plate assembly of FIG. 5.
Figure 7:
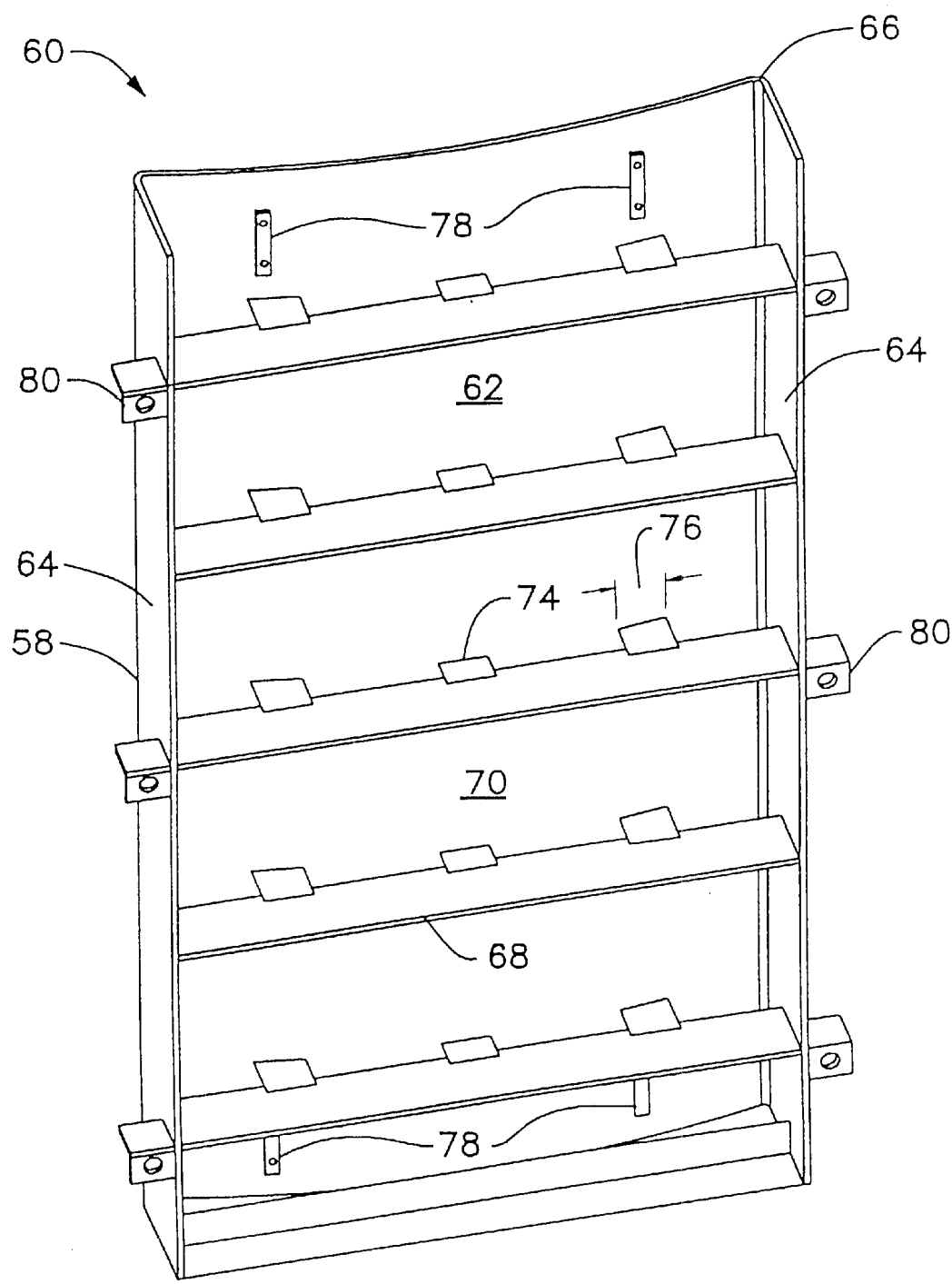
FIG. 7 is a perspective view of the radially outer side of the axial seal plate assembly of FIG. 5.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 24 and an air sector 26. Corresponding sector plates are also located on the bottom of the unit. Mounted on the inside of the housing are axial seal plate assemblies 28 which extend the full height of the rotor.

The hot flue gases enter the air preheater 10 as indicated by the arrow 30, flow through the flue gas sector 24 where heat is transferred to the heat transfer surface in the rotor 14. As this hot heat transfer surface then rotates through the air sector 26, the heat is transferred to the air flowing through the rotor from the bottom as indicated by the arrow 32. Consequently, the cold air inlet and the cooled gas outlet define a cold bottom end and the hot gas inlet and the heated air outlet define a hot top end. The rotor 14 has a shell 34 and is divided into a plurality of pie-shaped compartments 36 by the diaphragm plates 38 with each compartment containing a plurality of heat exchange basket modules 40.

The axial seal plate 42 of a conventional axial seal plate assembly 28 generally includes a pair of side plates 44 which are each mounted to the side edges 46 of the curved seal plate 42 by long seam weld 48. The long length of the welds 48 joining the side plates 44 to the seal plate 42 leads to various weld distortions, which effect the close tolerances required for the axial seal plate 42. Multiple support ribs 50 are mounted to the radially outer surface 52 of the seal plate 42 with multiple stitch welds 54 to provide pressure stiffening. The radially inner edge 56 of the support ribs 50 are usually burned to a radius which matches the curvature at the seal plate 42.

The axial seal plate 58 of an axial seal plate assembly 60 in accordance with the present invention is a single, unitary structure, rolled and formed to have a sealing portion 62 disposed intermediate oppositely disposed integral end portions 64. The use of a unitary axial seal plate 58 eliminates the need for two vertical seam welds to join the end portions 64 to the sealing portion 62. To facilitate rolling the end portions 64, a transition portion 66 is formed between the sealing portion 62 and each end portion 64. The transition portion 66 splits the ninety degree (90°) bend defined by the sealing portion 62 and each end portion 64 into two forty-five degree (45°) bends.

Multiple pressure stiffening bars 68 are mounted to the radially outer surface 70 of the sealing portion 62 to ensure that the seal plate 58 is sufficiently rigid. The radially inner edge 72 of each stiffening bar 68 is not burned to the radius of the sealing portion 62, as are conventional support bars 50. Rather, the stiffening bars 68 have a rectangular shape. Tabs 74 welded to the outer surface 70 of the axial seal plate 58 and the stiffening bars 68 bridge any gaps between the inner edge 72 of the stiffening bars 68 and the outer surface 70 at the sealing portion 62 and thereby mount the stiffening bars 68 to the seal plate 58.

Preferably, each tab 74 has a length 76 of 3 inches. As shown in FIG. 8, three tabs 74 generally provide sufficient support to mount each stiffening bar 68 to the seal plate 58. Although each tab 74 is welded along its full length 76 to the seal plate 58, the limited number of tabs 74 and the fixed length 76 of the tab 74 reduces the total length of the weld required to mount each bar 68, compared to conventional seal plate assemblies 28, reducing weld distortions in the sealing portion 62. That is, a total weld length of 18 inches is required to mount each stiffening bar 68 of the subject invention to the seal plate 58 while the minimum total weld lengths of 52 inches are generally required in conventional seal plate assemblies 28. Since the sealing portion 62 has a close tolerance (0.060" on the radius over 10–12 feet), eliminating weld distortions reduces the assembly time.

The low distortion axial seal plate assembly 60 also includes four seal plate plugs 78 through which the axial seal plate assembly 60 is set at the proper dimension. This eliminates the requirement for multiple access doors on each side of all axial seal plates common to the current axial seal plate design. L-shaped adjusters 80 mounted to the end portions 64 of the seal plate 58 facilitate positioning the seal plate assembly 60 during installation and removal.

It should be appreciated that the low distortion axial seal plate assembly 60 requires less structural parts, requires less welding, and eliminates the need for access doors. Consequently, the assembly 60 may be manufactured and installed at a significant cost savings, compared to conventional axial seal plate assemblies 28.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An air preheater having a post, a rotor housing, and a rotor located in the rotor housing and rotatable around the post, the housing including a plurality of axial seal plates, each of the axial seal plates comprising a single, unitary structure including a sealing portion, oppositely disposed first and second end portions, and first and second transition portions, the sealing portion having radially inner and outer surfaces, the first and second end portions extending substantially orthogonally from the outer surface of the sealing portion, the first and second transition portions being disposed intermediate the sealing portion and the first and second end portions, respectively, the axial seal plate not including any welds for joining the end portions to the sealing portion.

2. The air preheater of claim 1, wherein the transition portion extends at an angle substantially equal to 45° from the sealing portion and the end portion extends at an angle substantially equal to 45° from the transition portion.

3. An air preheater having a post, a rotor housing, and a rotor located in the rotor housing and rotatable around the post, the housing including a plurality of axial seal plates, each of the axial seal plates comprising:
   a single, unitary structure including a sealing portion and oppositely disposed first and second end portions, the sealing portion having radially inner and outer surfaces, the first and second end portions extending substantially orthogonally from the outer surface of the sealing portion, the axial seal plate not including any welds for joining the end portions to the sealing portion;
   a plurality of pressure stiffening bars mounted to the radially outer surface of the sealing portion, each of the pressure stiffening bars having a radially inner edge; and
   a plurality of tabs, at least one of the tabs mounting each of the pressure stiffening bars to the outer surface of the sealing portion of the seal plate.

4. The air preheater of claim 3 wherein each of the tabs has a radially inner edge and a radially outer edge portion, the inner edge of each tab being welded to the outer surface of the sealing portion of the seal plate and the outer edge portion being welded to the pressure stiffening bar.

5. The air preheater of claim 3 wherein three tabs mount each pressure stiffening bar to the sealing portion of the seal plate.

6. The air preheater of claim 5 wherein each of the tabs has a length substantially equal to three inches.

7. The air preheater of claim 6 wherein each tab is welded along its full length to the outer surface of the sealing portion of the seal plate.

8. An air preheater having a post, a rotor housing, and a rotor located in the rotor housing and rotatable around the post, the housing including a plurality of axial seal plates, each of the axial seal plates comprising:
   a single, unitary structure including a sealing portion and oppositely disposed first and second end portions, the sealing portion having radially inner and outer surfaces, the first and second end portions extending substantially orthogonally from the outer surface of the sealing portion, the axial seal plate not including any welds for joining the end portions to the sealing portion; and
   a plurality of seal plate plugs.

9. An air preheater having a post, a rotor housing, and a rotor located in the rotor housing and rotatable around the post, the housing including a plurality of axial seal plates, each of the axial seal plates comprising:
   a single, unitary structure including a sealing portion and oppositely disposed first and second end portions, the sealing portion having radially inner and outer surfaces, the first and second end portions extending substantially orthogonally from the outer surface of the sealing portion, the axial seal plate not including any welds for joining the end portions to the sealing portion; and
   a plurality of L-shaped adjusters mounted to the first and second end portions of the seal plate.

\* \* \* \* \*